United States Patent
Kuribayashi et al.

(10) Patent No.: US 10,431,247 B2
(45) Date of Patent: Oct. 1, 2019

(54) MAGNETIC HEAD CONTROL CAPABLE OF AVOIDANCE MEDIA BUMPS DURING SEEKING PROCESS

(71) Applicants: Kabushiki Kaisha Toshiba, Minato-ku, Tokyo (JP); Toshiba Electronic Devices & Storage Corporation, Minato-ku, Tokyo (JP)

(72) Inventors: Tetsuo Kuribayashi, Yokohama Kanagawa (JP); Hironori Kanno, Tokyo (JP); Masami Tashiro, Komae Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/919,783

(22) Filed: Mar. 13, 2018

(65) Prior Publication Data

US 2019/0088277 A1 Mar. 21, 2019

(30) Foreign Application Priority Data

Sep. 19, 2017 (JP) .................................. 2017-179026

(51) Int. Cl.
*G11B 5/60* (2006.01)
*G11B 5/012* (2006.01)
*G11B 5/55* (2006.01)

(52) U.S. Cl.
CPC ............ *G11B 5/6011* (2013.01); *G11B 5/012* (2013.01); *G11B 5/5547* (2013.01); *G11B 5/5534* (2013.01); *G11B 5/6017* (2013.01); *G11B 5/6023* (2013.01); *G11B 5/6029* (2013.01); *G11B 5/6076* (2013.01)

(58) Field of Classification Search
None
See application file for complete search history.

(56) References Cited

U.S. PATENT DOCUMENTS

| | | | |
|---|---|---|---|
| 6,377,422 B1* | 4/2002 | Boutaghou | G11B 5/6005 360/230 |
| 6,760,182 B2* | 7/2004 | Bement | G11B 5/4826 360/244.8 |
| 6,898,034 B2* | 5/2005 | Dakroub | G11B 5/6005 360/31 |
| 7,271,975 B2* | 9/2007 | Shimizu | G11B 5/455 360/25 |

(Continued)

FOREIGN PATENT DOCUMENTS

JP 2006-309901 A 11/2006

*Primary Examiner* — Tan X Dinh
(74) *Attorney, Agent, or Firm* — White & Case LLP (57) ABSTRACT

According to one embodiment, a magnetic disk drive selects in command evaluation in reordering processing, a command accessible in a shortest time. The device determines whether media bumps which influence a dynamic flying height (DFH) control exist in a seek section between completion of a previous command and start of a selected command or not, calculates a latency necessary for avoidance of the media bumps if it is determined by the determination that the media bumps which influence the DFH control exist, and selects the command accessible in the shortest time including the time obtained by summing the latency calculated by the calculation as the command to be next processed.

14 Claims, 6 Drawing Sheets

(56) References Cited

U.S. PATENT DOCUMENTS

| | | | |
|---|---|---|---|
| 7,684,138 B2 | 3/2010 | Kitamura et al. | |
| 7,872,828 B1* | 1/2011 | Sutardja | G11B 5/6029 360/75 |
| 8,665,547 B1* | 3/2014 | Yeo | G11B 5/59688 360/55 |
| 8,873,191 B2 | 10/2014 | Li et al. | |
| 9,129,633 B1* | 9/2015 | Gan | G11B 5/6076 |
| 9,443,543 B1* | 9/2016 | Akiya | G11B 5/6076 |
| 10,229,707 B2* | 3/2019 | Ishii | G11B 5/607 360/75 |
| 2005/0046982 A1* | 3/2005 | Liu | G11B 5/58 360/31 |
| 2006/0193075 A1* | 8/2006 | White | G11B 5/02 360/75 |
| 2007/0146920 A1* | 6/2007 | Kitamura | G11B 5/40 360/53 |

\* cited by examiner

| | |
|---|---|
| First Media Bump Head/Track Number [n]<br>Data Format : HHTTTTTT(HH : Head,TTTTTT : Track)<br>n : 0~Number of maximum media bumps-1 | Example<br>This track include position<br>"B1s" and "B2s" in figure 3 |
| Last Media Bump Head/Track Number [n]<br>n : 0~Number of maximum media bumps-1<br>Data Format : HHTTTTTT(HH : Head,TTTTTT : Track) | Example<br>This track include position<br>"B1e" and "B2e" in figure 3 |

MAGNETIC HEAD CONTROL CAPABLE OF AVOIDANCE MEDIA BUMPS DURING SEEKING PROCESS

CROSS-REFERENCE TO RELATED APPLICATIONS

This application is based upon and claims the benefit of priority from Japanese Patent Application. No. 2017-179026, filed Sep. 19, 2017, the entire contents of which are incorporated herein by reference.

FIELD

Embodiments described herein relate generally to magnetic disk drive and a magnetic head control method.

BACKGROUND

In a magnetic disk drive, in general, dynamic flying height (DFH) control of raising a magnetic head to a flying height position for seek simultaneously with seek start and falling the magnetic head to a flying height position for read/write (hereinafter R/W) before seek completion is executed.

In the magnetic disk drive, control for media bump avoidance is executed together with DFH control. In this case, media bumps exist in the seek destination direction of the seek start track and, if the magnetic heads are expected to collide with the media bumps, control of delaying the seek start until the magnetic heads reaches the flying height position for seek is executed. In addition, media bumps exist in the seek source direction of the seek completion track and, if the magnetic heads are expected to collide with the media bumps, control of falling the magnetic heads after passing the media bumps is executed.

If the above-explained DFH control and control for media bump avoidance are executed, a latency caused by the media bump avoidance control is not considered, but the time obtained by summing a seek time determined from a seek distance and a rotational latency determined by a relationship between an R/W enable sector position and sector position of a command to be evaluated, after seek completion, is used and, if a command accessible in the shortest time is selected by the reordering, the seek is delayed due to the media bump avoidance, rotational latency occurs in a case where the seek is not completed before a start sector of a selected command, and the performance is degraded.

The object to be solved by the embodiments is to provide a magnetic disk drive and a magnetic head control method capable of reducing the rotational latency by considering the seek latency which occurs due to the media bump avoidance control executed together with the DFH control, at the reordering operation.

DETAILED DESCRIPTION

Embodiments will be described hereinafter with reference to the accompanying drawings.

In general, according to one embodiment, a magnetic disk drive includes a determiner, a calculator and a selector. The determiner determines whether media bumps which influence a dynamic flying height (DFH) control exist in a seek section between completion of a previous command and start of a selected command or not in a reordering operation. The calculator calculates latency necessary for avoidance of the media bumps if it is determined by the determiner that the media bumps which influence the DFH control exist. The selector selects the command accessible in the shortest time including the time obtained by summing the latency as the command to be next processed.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

Embodiments

Figure 1:
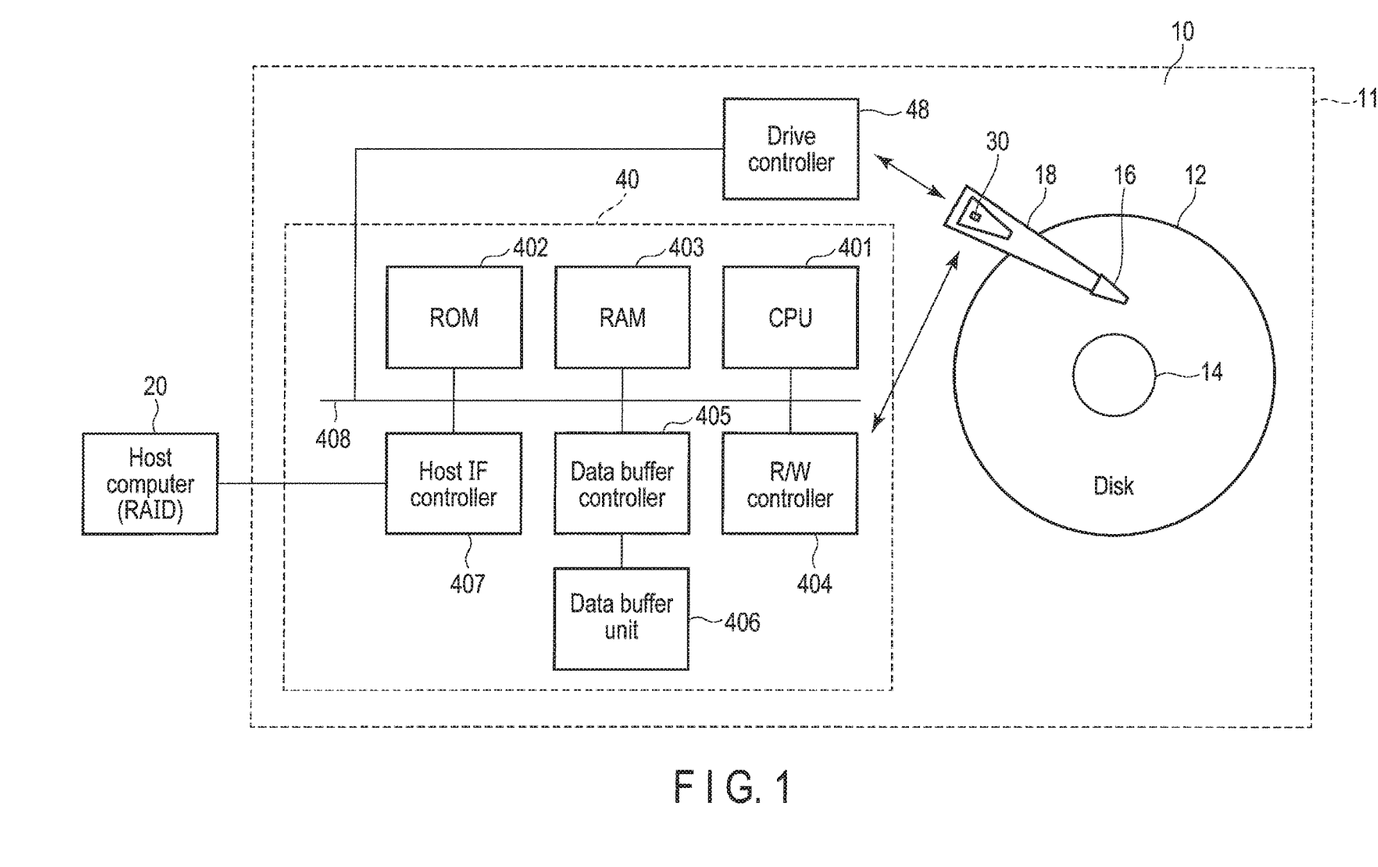
FIG. 1 is a block diagram schematically showing a magnetic disk drive (HDD) according to the embodiments.

A structure of a magnetic disk drive (hard disk drive: HDD) according to the embodiments will be explained with reference to FIG. 1 to FIG. 4. FIG. 1 is a block diagram schematically showing a magnetic disk drive (HDD) according to the embodiments. An HDD 10 shown in FIG. 1 comprises a housing 11, a magnetic disk 12 serving as a recording medium arranged in the housing 11, a spindle motor 14 supporting and rotating the magnetic disk 12, and a plurality of magnetic heads 16 which write data to the magnetic disk 12 and read data from the magnetic disk 12. The HDD 10 comprises a head actuator 18 which moves and positions each of the magnetic heads 16 onto an arbitrary track on the magnetic disk 12. The head actuator 18 comprises a suspension assembly which supports the magnetic heads 16 to be movable and a voice coil motor (VCM) which rotates the suspension assembly, though not illustrated in the drawing.

The HDD 10 comprises a head amplifier 30, a main controller 40, and a drive controller 48. The head amplifier 30 is provided on, for example, the suspension assembly of the head actuator 18 and is electrically connected to the magnetic heads 16. The main controller 40 and the drive controller 48 are constituted on, for example, a control circuit board (not shown) provided on a back surface side of the housing 11. The main controller 40 comprises an operation processor (central processing unit: CPU) 401, a read only memory (ROM) 402 for storing programs, a random access memory 403 for data processing work, a read/write (R/W) controller 404, a data buffer controller 405, a data buffer unit 406, and a host interface (IF) controller 407, and is connected to the elements via a bus 408. The main controller 40 is electrically connected to the head amplifier IC 30 and the driver IC 48 to the VCM 22 and the spindle motor 14. In addition, the main controller 40 can be connected to a host computer (RAID controller) 20 under control of the host interface (IF) controller 407.

Figure 2:
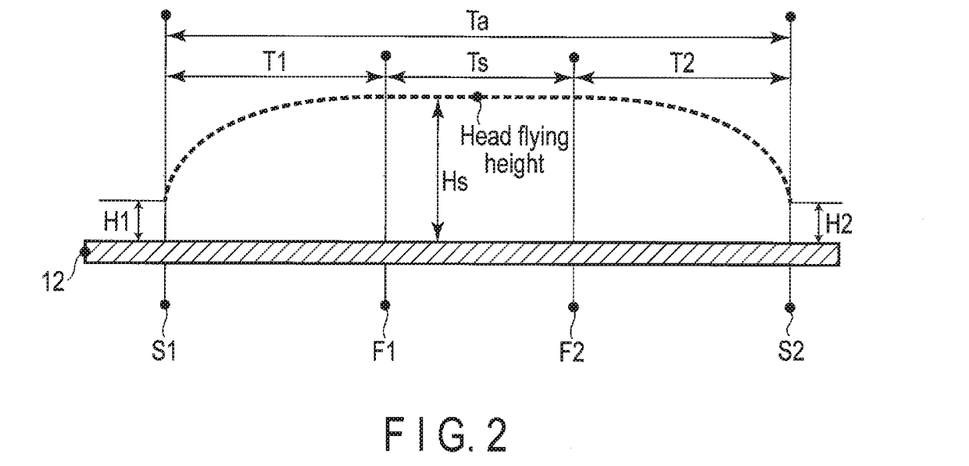
FIG. 2 is a cross-sectional view for explanation flying height of the magnetic head under general DFH control, at a seek operation, in the embodiments.
Figure 3:
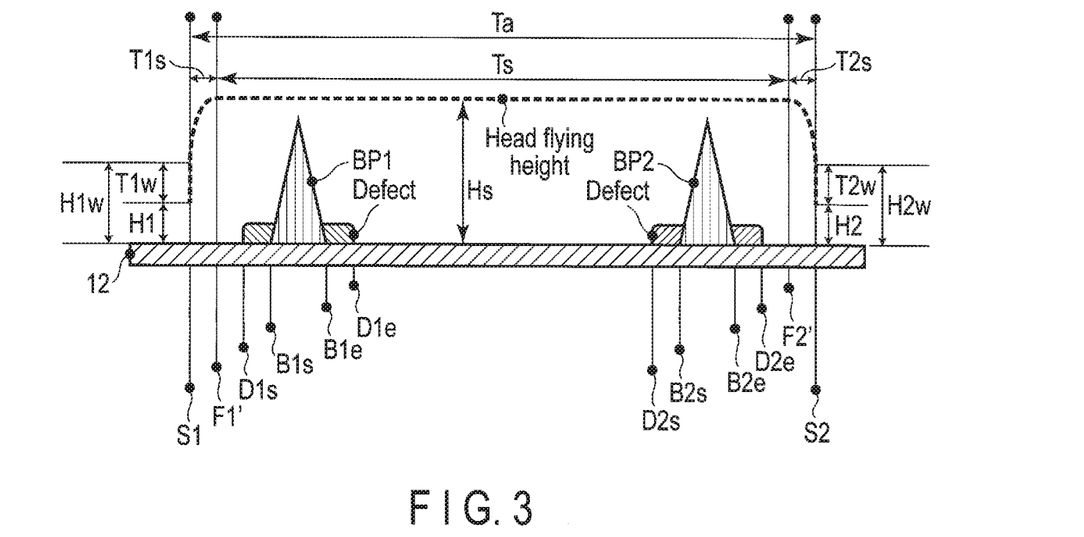
FIG. 3 is a cross-sectional view for explanation flying height of the magnetic head under general DFH control with a media bump avoidance, at a seek operation, in the embodiments.
Figure 4:
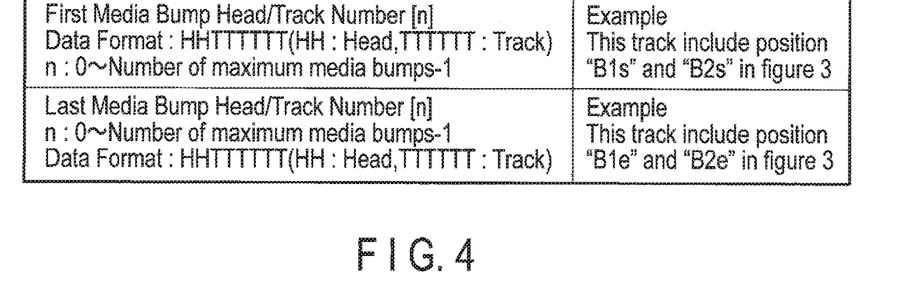
FIG. 4 is a diagram showing an example of media bump information preliminarily measured for each medium, in the embodiments.

Control of the main controller 40 on the HDD 10 having the above-explained configuration will be explained with reference to FIG. 2 to FIG. 4. FIG. 2 is a cross-sectional view for explanation flying height of the magnetic head under general DFH control, at a seek operation, FIG. 3 is a cross-sectional view for explanation flying height of the magnetic head under general DFH control with a media bump avoidance, at a seek operation, and FIG. 4 is a diagram showing an example of media bump information preliminarily measured for each medium. In FIG. 2 and FIG. 3, Tx represents the time, Hx represents the head flying height, Sx/Fx represents the location (track), Dx represents the defect area edge (track), and Bx represents the media bump location.

The main controller 40 forms and holds information on media bumps in The form of media bump information shown in FIG. 4, in the RAM 403. As shown in FIG. 2, when executing seek from read/write end location S1 to read/write start location S2, the main controller 40 executes dynamic flying height (DFH) control that changes the flying height of the magnet head 16 from the previous read/write (or the standby) flying height H1 to flying height Hs for seek, and change the flying height Hs to flying height H2 for read/write before read/write.

In the embodiments, the time to change the flying height of the magnetic heads 16 from H1 to Hs is T1, the time to change the head flying height of the magnetic heads 16 from Hs to H2 is T2, and the time elapsed until the evaluated command start is T1+Ts+T2 as shown in FIG. 2. The main controller 40 determines whether the media bumps exist in a seek section in which the flying height is not the flying height Hs for seek in the seek section or not, by using the media bump information.

FIG. 3 shows a DFH control example in which seek of the same section as that shown in FIG. 2 is executed if media bumps exist in the seek section in the HDD 10 according to the embodiments. If media bump B1 exists in a section in which the flying height of the magnetic heads 16 is changed from H1 shown in FIG. 3 to Hs, the HDD 10 according to the embodiments raises the magnetic heads 16 from H1 shown in FIG. 3 to Hs and then executes seek to pass the media bump BP1.

The time to raise the magnetic heads 16 from H1 shown in FIG. 3 to Hs is the time obtained by summing the time to raise the magnetic heads 16 from H1 shown in FIG. 3 to H1w without seeking at S1 in FIG. 3 and the time to raise the magnetic heads 16 from H1w shown in FIG. 3 to Hs while seeking from S1 shown in FIG. 1 to F1', and the time matches T1 shown in FIG. 2. A section from S1 shown in FIG. 3 to F1' of the seek section in which the magnetic heads 16 are raised is set to be long in the figure but seek may not be executed until the magnetic heads 16 are made to fly at S1 shown in FIG. 3.

In the HDD 10 according to the embodiments, if media bump B2 exists in a section in which the flying height of the magnetic heads 16 is changed from Hs shown in FIG. 3 to H2, the flying height of the magnetic heads 16 is changed from Hs shown in FIG. 3 to H2 after the magnetic heads 16 pass the media bump BP2. In the embodiments, the time to lower the fly of the magnetic heads 16 from Hs shown in FIG. 3 to H2 is the time obtained by summing the time to fall the magnetic heads 16 from. Hs shown in FIG. 3 to H2w while seeking from F2' to S1 in FIG. 3 and the time to fall the magnetic heads 16 from H2w shown in FIG. 3 to H2 without seeking at S1 in FIG. 3, and the time matches T2 shown in FIG. 2.

In the embodiments, change of the flying height is started while seeking from F2' in FIG. 3 to S2, but the flying height may be changed after reaching S2 in FIG. 3.

In the embodiments, the time T1w to raise the magnetic heads 16 from H1 shown in FIG. 3 to H1w without seeking at S1 in FIG. 3 can be calculated by subtracting the time necessary to seek the section between S1 shown in FIG. 3 and B1s from the time to raise the magnetic heads 16 from H1 shown in FIG. 3 to Hs.

The time T2w to fail the magnetic heads 16 having reached S2 in FIG. 3 from H2w shown in FIG. 3 to H2 can be calculated by subtracting the time necessary to seek from B2e to S2 from the time to fall the magnetic heads 16 from Hs shown in FIG. 3 to H2.

The above-explained processing of calculating T1w and T2w is determined by a positional relationship between the seek start point and end point and the media bumps, and each of T1w and T2w, the time in which the fly control is executed without seeking becomes a seek latency generated by the media bumps.

If the above-explained processing of calculating T1w and T2w is simplified, T1s and T2s become 0, T1w shown in FIG. 3 becomes T1 shown in FIG. 1, T2w shown in FIG. 3 becomes equivalent to T2 shown in FIG. 2, and each of the T1w and T2w becomes the latency generated by the media bumps.

As a method of calculating the times T1s and T2s to control flying height while seeking as values other than 0 after simplifying the processing of calculating T1w and T2w, increasing the time to enable the control of flying height while seeking, and reducing the latency T1w and the latency T2w occurring by the media bumps, the time T1s shown in FIG. 3 can be calculated as the seek start operation time in which the seek is controlled to start from D1s and pass at B1s and the time T2s can be calculated as the seek stop operation time in which the seek is controlled to pass at B2e and stop at D2e, by adding defect (defect information) which cannot be accessed by the computer 20 shown in FIG. 1 to the surroundings of the media bumps BP1 and BP2 representing in FIG. 3 the distance from S1 shown in FIG. 3 to F1' and the distance from F2' to S2.

Figure 5:
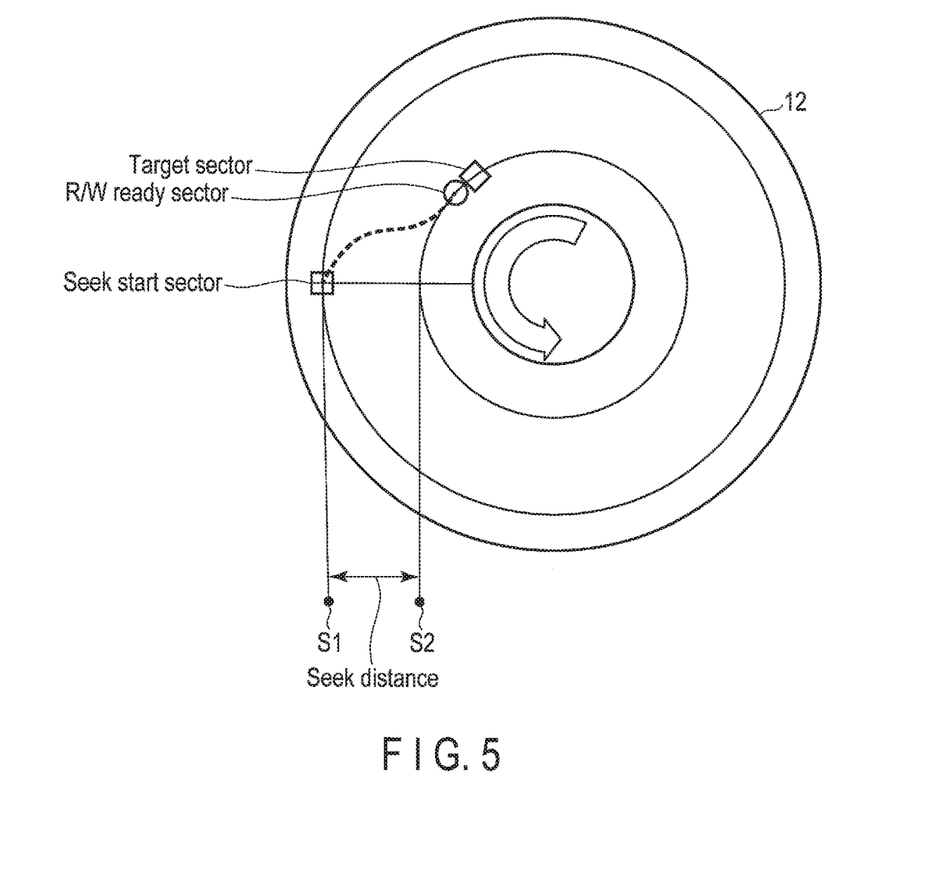
FIG. 5 is a top view of showing a seek locus image of the magnetic head under DFH control for explanation of a reordering operation, in the embodiments.
Figure 6:
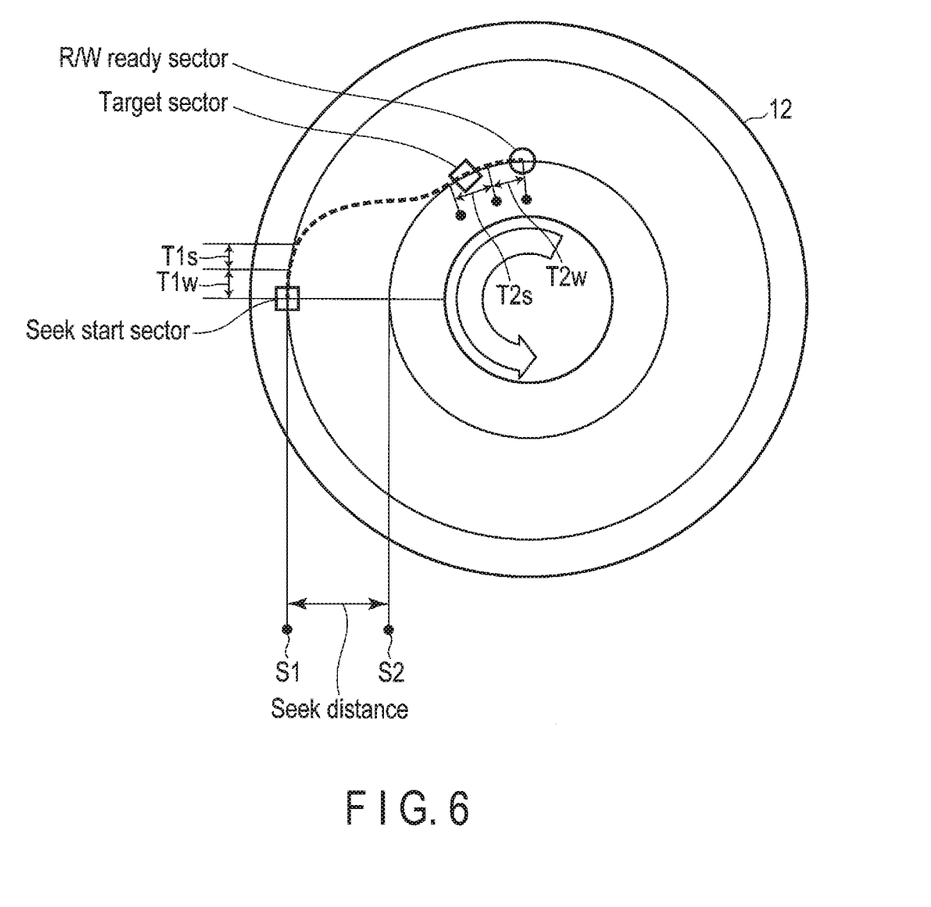
FIG. 6 is a top view of showing a seek locus image of the magnetic head under DFH control with a media bump avoidance for explanation of a reordering operation, in the embodiments.

Reordering operation select a command which should be next executed while executing a certain command, in the HDD 10 executing the DFH control of the embodiments, will be explained with reference to FIG. 5 to FIG. 8. FIG. 5 is a top view showing a seek locus image of the magnetic heads under the DFH control for explanation of a reordering operation, FIG. 6 is a top view showing a seek locus image of the magnetic heads under the DFH control with a media bump avoidance for explanation of a reordering operation, FIG. 7 is a flowchart for explanation of a processing reordering operation, and FIG. 8 is a characteristic graph showing a relationship between the number of media bumps and the random access performance (A is a graph in the conventional device and B is a graph in the embodiments).

Figure 7:
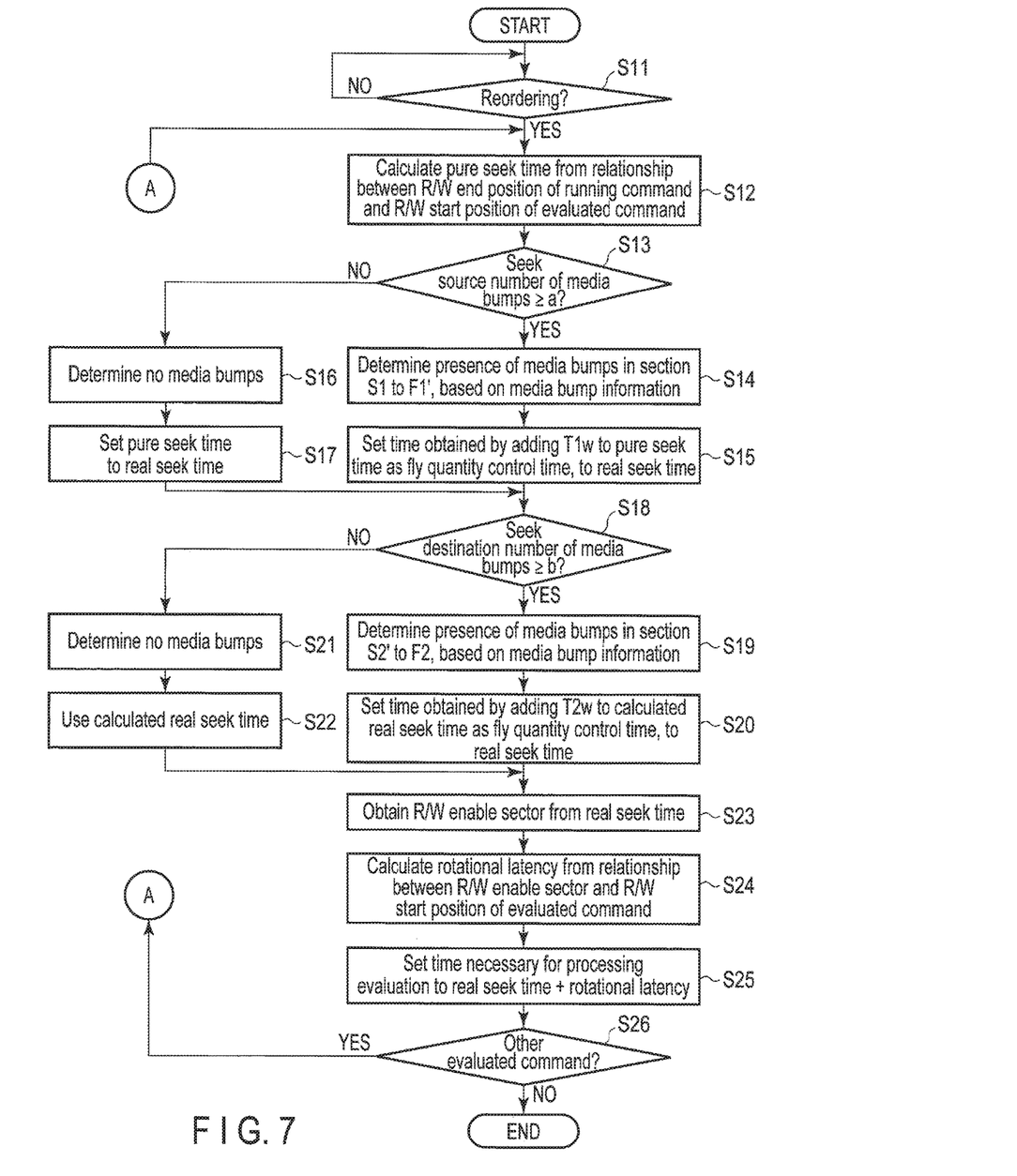
FIG. 7 is a flowchart for explanation of a processing reordering operation, in the embodiments.
Figure 8:
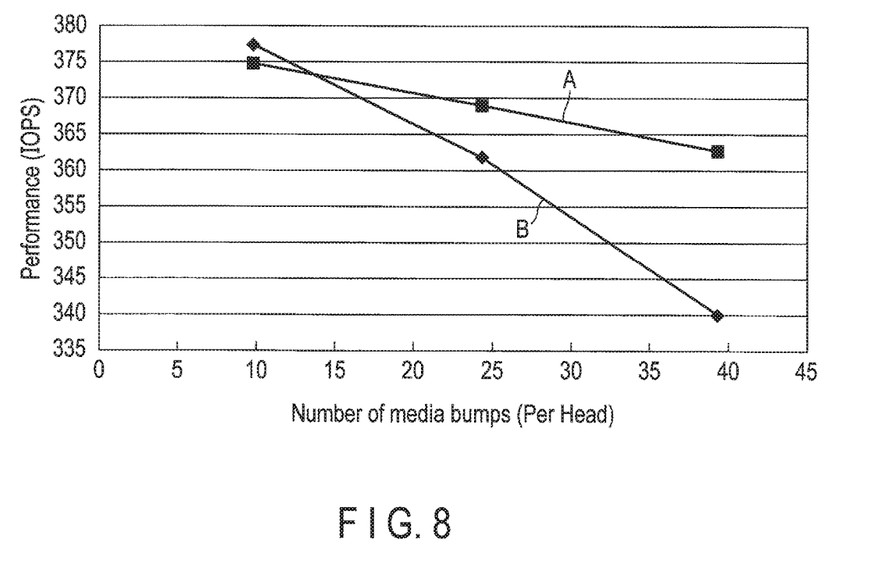
FIG. 8 is a characteristic graph showing a relationship between number of media bumps and the random access performance, in the embodiments.

In the above reordering operation, the time is calculated and evaluated in accordance with the flowchart shown in FIG. 7. S1 in FIG. 3 is a currently running command R/W completion position, and S2 in FIG. 3 is an R/W start position of a command to be evaluated.

In FIG. 7, if the reordering is started (step S11), a pure seek time (Ta=T1s+Ts+T2s) is calculated from a relationship between the R/W end position of the currently running command (seek start sector in FIG. 6) and the R/W start position of the evaluated command (target sector in FIG. 5) (step S12). If no media bumps exist on a medium surface of the magnetic heads 16 of the seek source, it is determined whether the media bumps exist in a section from S1 to F1' for seek at time T1 at which the head flying height is raised to the flying height for seek or not, with reference to the media bump information shown in FIG. 4. More specifically, it is determined whether the number of media bumps existing on the medium surface of the magnetic heads 16 of the seek source is larger than or equal to constant number a (number of media bumps—performance characteristic in FIG. 8) or not (step S13) and, if the number of media bumps is larger than or equal to the constant number a, the presence of the media bumps in the section from S1 to F1' is determined (step S14), and the time obtained by adding T1w to the pure seek time as the flying height control time is handled as a real seek time (step S15). If the number of media bumps is smaller than the constant number a, it is determined that no media bumps exist without executing the search (step S16) and the pure seek time is handled as the real seek time (step S17), to suppress increase in the calculation time.

The random access performance (input/output operations per second: IOPS) shown in FIG. 8 is an index indicating the number of time of executing the 10 per second.

Next, it is determined whether the number of media bumps existing on the medium surface of the magnetic heads 16 of the seek source is larger than or equal to constant number b (i.e., the number of media bumps at which the performance is reversed by (the number of media bumps—performance characteristic in FIG. 8)) or not (step S18) and, if the number of media bumps is larger than or equal to the constant number b, the presence of the media bumps in the section from F2' to S2 is determined with reference to the media bump information (step S19), and the time obtained by adding T2w to the calculated real seek time as the flying height control time is handled as the real seek time (step S20). If the number of media bumps is smaller than the constant number b, it is determined that no media bumps exist without executing the search (step S21) and the calculated real seek time is handled as the real seek time (step S22), to suppress increase in the calculation time.

A sector (R/W ready sector in FIG. 6) in which read/write is enabled is obtained from the real seek time calculation result (step S23), a rotational latency is calculated based on a positional relationship between an R/W enable sector and the R/W start position (i.e., the target sector in FIG. 5) of the evaluated command (step S24), and the time necessary for processing evaluation is handled as the real seek time+rotational latency (step S25). Presence of the other evaluated commands is determined. (step S26) and, if the other evaluated commands exist the processing is executed by changing the evaluated commands from step S12, and if no other evaluated commands exist a sequence of processing is ended.

In the processing, T1w and T2w in FIG. 3 may be values different at read and write. In addition, in the processing, the processing of determining whether the media bumps exist when using T1w and T2w may not be executed at an access at which T1w and T2w in FIG. 3 become 0. In the processing, the times T1s and T2s in FIG. 3 may be included in T1w and T2w. In the processing, if it can be determined whether the media bumps can exist from the seek distance from S1 in FIG. 3 to S2 in FIG. 3, whether the media bumps exist or not may be determined from the seek distance alone.

In the magnetic disk drive according to the embodiments, as explained above, when access to the disk is being executed together with the command processing, in the reordering, the command which should be next processed is determined in the command group standing by inside the HDD, the time obtained by summing the seek time determined in accordance with the seek distance and the rotational latency which is determined after the seek completion by the positional relationship between the R/W enable sector position and the sector of the evaluated command is used in the command evaluation of the reordering, if the command accessible in the shortest time is selected it is determined whether the media bumps influencing the DFH control exist in the seek section from the previous command completion to the evaluated command start or not, if the media bumps influencing the DFH control are determined to exist the command accessible in the shortest time can be selected at the time obtained by summing the latency necessary for the media bump avoidance.

In other words, by detecting the media bumps influencing the DFH/seek control in the seek section and executing the reordering while considering the latency which occurs due to the media bump avoidance, the seek time from the current command completion position to the next command candidate lead position can be calculated correctly, the optimum next command can be thereby selected, and the degradation of performance caused by the media hump avoidance control can be suppressed.

In addition, by changing consideration of the media bumps in accordance with the number of media bumps, the latency occurring by the media bump avoidance control can be calculated in the HDD having a smaller number of media bumps, a maximum number of commands that can be evaluated by the reordering executed between the commands can be reduced, and degradation of the performance can be suppressed.

By changing consideration of the media bumps in accordance with the seek distance, in a case where the seek control and the DFH control system are different in accordance with the seek distance, influence to the media bump avoidance control can be calculated correctly, and degradation of the performance can be suppressed.

By separately calculating the latency occurring due to the media bump avoidance control for read and write, in a case where the DFH control systems are different for read and write, influence to the media bump avoidance control can be calculated correctly, and degradation of the performance can be suppressed.

By separately calculating the latency occurring due to the media bump avoidance control for the respective magnetic heads in consideration of the characteristic (DFH control speed) for each of the magnetic heads, in a case where the DFH control speeds are different for each of the magnetic heads, influence to the media bump avoidance control can be calculated correctly, and degradation of the performance can be suppressed.

By inserting the defect (defect information) for the predetermined track skip into the surroundings of the media bumps and reducing areas subjected to the media bump avoidance control, the calculation occurrence frequency and the calculation time considering the media bump avoidance control at the reordering can be reduced, and degradation of the performance can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
a selector selecting a plurality of evaluation commands in order in a command reordering operation;
a determiner determining whether media bumps which influence a dynamic flying height (DFH) control exist in a seek section between completion of a previous command and start of a selected evaluation command or not; and
a calculator calculating a delay time necessary for avoidance of the media bumps if it is determined by the determiner that the media bumps which influence the dynamic flying height (DFH) control exist; wherein
the reordering operation compares a latency time which is obtained by summing a seek time which is determined in accordance with a seek distance, a rotational latency time which is determined after a seek completion and the delay time of each of a plurality of evaluation commands, and selects the evaluation command of the shortest latency time as the command to be next processed.

2. The magnetic disk drive of claim 1, wherein the selector changes whether the influence of the media bumps is considered or not, based on number of the media bumps.

3. The magnetic disk drive of claim 1, wherein the selector changes whether the influence of the media bumps is considered or not, based on the seek distance between the completion of the previous command and the start of the selected command.

4. The magnetic disk drive of claim 1, wherein the calculator calculates the delay time generated by the media bump avoidance control at a read and a write separately.

5. The magnetic disk drive of claim 1, wherein the calculator calculates the delay time generated by the avoidance control of the media bumps for each head for the disk.

6. The magnetic disk drive of claim 1, wherein the calculator calculates the delay time generated by the avoidance control of the media bumps by considering a characteristic based on a DFH control speed for each head for the disk.

7. The magnetic disk drive of claim 1, wherein the calculator calculates the delay time, based on default information for executing predetermined track skip inserted into a surrounding of the media bumps on the disk.

8. A magnetic disk control method of a magnetic disk drive comprising:
a selecting a plurality of evaluation commands in order in a command reordering operation;
determining whether media bumps which influence a dynamic flying height (DFH) control exist in a seek section between completion of a previous command and start of a selected evaluation command or not;
calculating a delay time necessary for avoidance of the media bumps if it is determined by the determination that the media bumps which influence the dynamic flying height (DFH) control exist;
comparing the latency time which is obtained by summing a seek time which is determined in accordance with a seek distance, a rotational latency time which is determined after a seek completion and the delay time of each of a plurality of evaluation commands;
selecting the evaluation command of the shortest latency time as the command to be next processed.

9. The magnetic head control method of claim 8, wherein it is changed by the selection whether the influence of the media bumps is considered or not, based on number of the media bumps.

10. The magnetic head control method of claim 8, wherein it is changed by the selection whether the influence of the media bumps is considered or not, based on the seek distance between the completion of the previous command and the start of the selected command.

11. The magnetic head control method of claim 8, wherein the calculation calculates the delay time generated by the media bump avoidance control at a read and a write separately.

12. The magnetic head control method of claim 8, wherein the calculation calculates the delay time generated by the avoidance control of the media bumps for each head for the disk.

13. The magnetic head control method of claim 8, wherein the calculation calculates the delay time generated by the avoidance control of the media bumps by considering a characteristic based on a DFH control speed for each head for the disk.

14. The magnetic head control method of claim 8, wherein the calculation calculates the delay time, based on default information for executing predetermined track skip inserted into a surrounding of the media bumps on the disk.

* * * * *